United States Patent [19]

Asako

[11] Patent Number: 5,602,665
[45] Date of Patent: Feb. 11, 1997

[54] OPTICAL TRANSMITTING/RECEIVING APPARATUS FOR BIDIRECTIONAL COMMUNICATION SYSTEMS

[75] Inventor: Katsuhiro Asako, Tokyo, Japan

[73] Assignee: NEC Corporation, Tokyo, Japan

[21] Appl. No.: 511,803

[22] Filed: Aug. 7, 1995

[30] Foreign Application Priority Data

Dec. 6, 1994 [JP] Japan .................................. 6-301825

[51] Int. Cl.[6] .............................................. H04B 10/00
[52] U.S. Cl. .......................... 359/152; 359/113; 359/179; 372/38
[58] Field of Search ........................... 359/113–114, 152, 359/173, 179, 188, 245, 322; 385/1–2; 372/38

[56] References Cited

U.S. PATENT DOCUMENTS

| | | | |
|---|---|---|---|
| 4,972,514 | 11/1990 | Linke ........................................ | 359/114 |
| 5,027,434 | 6/1991 | Brahms et al. ........................... | 359/113 |
| 5,349,462 | 9/1994 | Defranco et al. ........................ | 359/152 |

FOREIGN PATENT DOCUMENTS

| | | | |
|---|---|---|---|
| 0512556 | 11/1992 | European Pat. Off. ................. | 359/152 |
| 2014723 | 8/1979 | United Kingdom ..................... | 359/152 |

Primary Examiner—Wellington Chin
Assistant Examiner—Kinfe-Michael Negash
Attorney, Agent, or Firm—Young & Thompson

[57] ABSTRACT

During transmitting operation, a voltage responding to transmission data is applied to an absorption type semiconductor optical modulator in such a manner that a semiconductor outputs constant intensity light, and this light is modulated in response to the transmission data during transmitting operation. The intensity-modulation is given by changes of absorption coefficient of the semiconductor optical modulator in response to applied voltage. Then, during receiving operation, the light outputted from the semiconductor laser is interrupted and a predetermined voltage is applied to the absorption type semiconductor optical modulator. Detecting light signals is given by monitoring current changes in response to level of signal light entered from a transmission path. A value of a current flowing through the absorption type semiconductor optical modulator is converted into a voltage signal representative of reception data by a current/voltage converting circuit.

25 Claims, 6 Drawing Sheets

FIG. 6D  LIGHT SIGNAL

FIG. 6E  RX

TRANSMITTING  RECEIVING

OPTICAL TRANSMITTING/RECEIVING APPARATUS FOR BIDIRECTIONAL COMMUNICATION SYSTEMS

BACKGROUND OF THE INVENTION

1. Field of the Invention

The present invention relates generally to an optical transmitting/receiving apparatus in communication systems. More particularly, the present invention relates to an optical transmitting/receiving apparatus in communication systems in which signals are bidirectionally transmitted in a time divisional manner by way of a single transmission medium.

2. Description of Related Art

Bidirectional transmission by a single optical fiber is very useful because of reduced requirement for the optical fiber. In this type of transmission system, it is necessary to provide an optical transmitting/receiving apparatus having both transmitting and receiving functions at terminals of the optical communication system.

The construction of a conventional optical transmitting/receiving apparatus in communication systems includes a separately arranged semiconductor laser to transmit signals into an optical fiber and a photodiode to receive signals from an optical fiber. Both the semiconductor laser and photodiode are coupled to the same optical fiber with an optical directional coupler. The semiconductor laser and the photodiode are connected to a laser driving circuit and a current/voltage converting circuit, respectively.

Transmission data input from one side of a terminal is converted into current signals for driving the semiconductor laser in the laser driving circuit. The semiconductor laser functions as an electric/optical converting element and outputs light signals having a level that is set in response to the current signals. These light signals pass through the optical directional coupler and then are output to the optical fiber.

On the other hand, light signals input from the optical fiber to the optical transmitting/receiving apparatus are coupled to the photodiode by the optical directional coupler. Changes in current are produced by the photodiode in response to intensity changes of the input light signals. Further, these current changes are converted into voltage changes by the current/voltage converting circuit. Then, these are output to a terminal as the received data.

In the above conventional optical transmitting/receiving apparatus in bidirectional communication systems, both the semiconductor laser and photodiode are required to separately output transmission signals and collect received signals. In addition, the optical directional coupler is necessary to conduct the light from the semiconductor laser into the optical fiber and to conduct the light from the optical fiber to the photodiode.

Subsequent optical communication systems in particular require more compact terminals. Discretely arranged, however, these optical elements prevent the terminals from being reduced in size. Also, complex manufacturing stages of this optical transmitting/receiving circuit are involved.

On the contrary, in half duplex transmission systems, so-called "ping-pong" communication systems, the semiconductor laser and photodiode are not always necessary at the same time because simultaneous operation is not required. In such half duplex transmission systems, more compact terminals are also required.

SUMMARY OF THE INVENTION

An object of the present invention is to provide an optical transmitting/receiving apparatus that can be easily manufactured and also be made much more compact by removing connecting devices such as an optical directional coupler.

The optical transmitting/receiving apparatus of the present invention includes a light emitting element, and an electro-absorption type semiconductor optical modulator whose light absorption coefficient changes in response to an applied voltage. The optical transmitting/receiving apparatus of the present invention mainly has both a transmitting section and a receiving section. The transmitting section functions to transmit light signals corresponding to transmission signals. The transmission light signals are produced by modulating emitting light having a predetermined constant value. The light with a constant value is emitted by the semiconductor laser. The modulation of the emitting light is performed by applying a voltage responding to the transmission signals to the absorption type semiconductor optical modulator.

On the other hand, the receiving section applies a predetermined voltage to the electro-absorption type semiconductor optical modulator when the signal light is not being transmitted by the transmitting section. This receiving section functions to detect a value of a current flowing through the electro-absorption type semiconductor optical modulator under application of the voltage, whereby received data responding to the detected current value is outputted.

The optical transmitting/receiving apparatus of the present invention is mainly characterized in that the transmitting and receiving elements are utilized in common. In the optical transmitting/receiving apparatus of the present invention, the electro-absorption type semiconductor optical modulator whose absorption coefficient is varied in response to applied voltage is employed to intensity-modulate the constant level light emitted from the semiconductor laser. The voltage signals for intensity-modulation are generated by a modulator driving circuit. In transmitting state under operating the modulator driving circuit, the light signals to be transmitted through the optical fiber is given by this intensity modulation. On the other hand, the receiving section includes a receiving circuit connected to the electro-absorption type semiconductor optical modulator. When operating the receiving circuit, the predetermined voltage is applied to the electro-absorption type semiconductor optical modulator. It is possible to receive transmitted light signals by monitoring the value of the current flowing through the electro-absorption type semiconductor optical modulator.

Further, the optical transmitting/receiving apparatus may be so arranged that the light signals are transmitted by the transmitting section during only a predetermined time period.

DESCRIPTION OF THE DRAWINGS

This above and other objects, features and advantages of this invention will become more apparent by reference to the following detailed description of the invention taken with reference to the accompanying drawing, wherein.

DETAILED DESCRIPTION OF THE PREFERRED EMBODIMENT

Before describing the preferred embodiments of the present invention, a conventional optical transmitting/receiving apparatus will be described to help in understanding the present invention.

Figure 1:
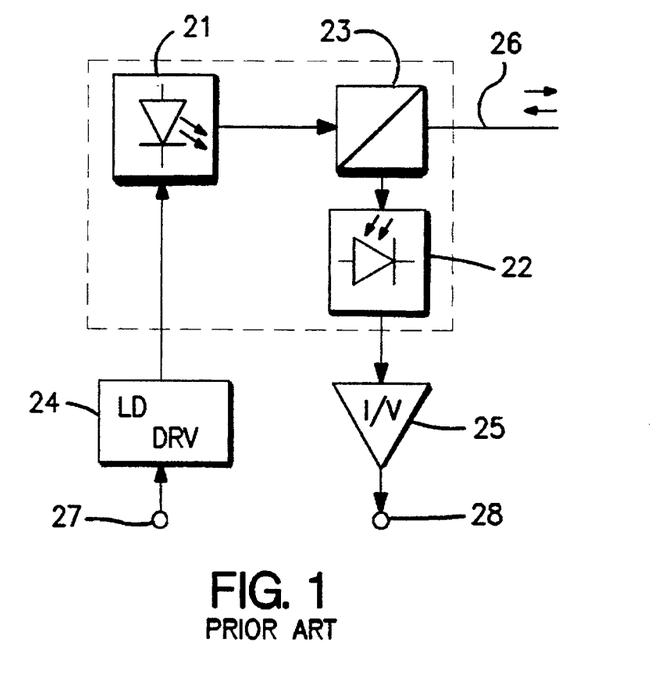
FIG. 1 is a block diagram showing the construction of a conventional optical transmitting/receiving apparatus in bidirectional communication systems.

FIG. 1 is a block diagram showing the construction of a conventional optical transmitting/receiving apparatus in bidirectional communication systems. As shown in FIG. 1, the conventional optical transmitting/receiving apparatus includes a semiconductor laser (LD) 21, a photodiode 22, an optical directional coupler 23, a semiconductor laser driving circuit (LD DRV) 24, and a current/voltage converting circuit (I/V) 25. The transmission data input from a terminal 27 is converted into a control signal for driving the semiconductor laser in the semiconductor laser driving circuit 24. The semiconductor laser 21 functions as an electric/optical converting element and outputs light (signal light) having a level corresponding to these control signals. These light signals pass through the optical directional coupler 23 and then are outputted to the optical fiber 26. This directional coupler 23 is usually structured by coupled optical fibers or an interference optical filter.

On the other hand, received light signals introduced through the optical fiber 26 into the optical transmitting/receiving apparatus are coupled to the photodiode 22 by the directional optical coupler 23. The received light signals are converted into current signals by the photodiode 22. Then, the current signals are further converted into voltage changes by the current/voltage converting circuit 25. The converted voltage signals are outputted to a terminal 28 as the received data.

As described above, the semiconductor laser (LD) 21 and the photodiode 22 must be separately provided, as is also the case for the optical directional coupler 23 to connect the optical fiber thereto. Therefore, this construction prevents the transmitting/receiving apparatus from being compact.

Figure 2:
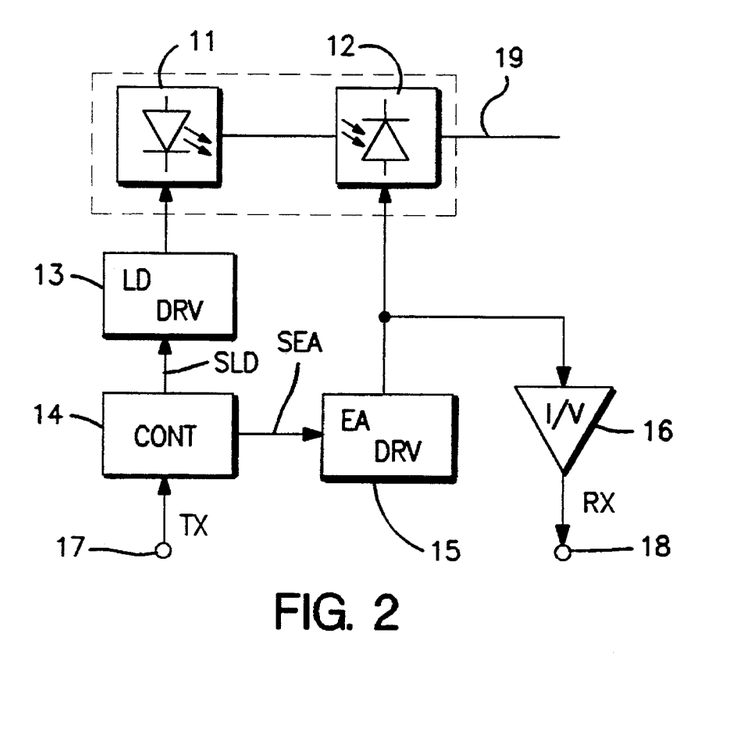
FIG. 2 is a block diagram showing the construction of an optical transmitting/receiving apparatus in bidirectional communication systems according to a first embodiment of the present invention.

The present invention will now be described in detail with respect to various preferred embodiments. FIG. 2 is a block diagram showing the construction of an optical transmitting/receiving apparatus for half duplex transmission according to a first embodiment of the present invention.

As illustrated in FIG. 2, the optical transmitting/receiving apparatus of the first embodiment comprises a semiconductor laser 11, an electro-absorption type semiconductor optical modulator 12, a laser driving circuit (LD DRV) 13, a control circuit (CONT) 14, a modulator driving circuit (EA DRV) 15 for the (electro-absorption type semiconductor) optical modulator 12, and a current/voltage converting circuit (I/V) 16.

The laser driving circuit 13 sends injection current to the semiconductor laser 11. The injection current is controlled by the control signal SLD from the control circuit 14 such that the output light from the semiconductor laser 11 constantly maintains a predetermined light level corresponding to communication distance. The laser light radiated from the semiconductor laser 11 passes through the (electro-absorption type semiconductor) optical modulator 12, and thereafter is coupled to the optical fiber 19. Both the semiconductor laser and the (electro-absorption type semiconductor) optical modulator are produced by crystal growing. The semiconductor laser 11 can be directly connected to the (electro-absorption type semiconductor) optical modulator 12 by being produced on a common semiconductor substrate.

The intensity of the light passing through the (electro-absorption type semiconductor) optical module 12 can be controlled by controlling the absorption coefficient. The absorption coefficience in turn can be controlled by controlling the voltage applied to the (electro-absorption type semiconductor) optical modulator 12. As a result, it is possible to control output light intensity by adjusting the level of the applied voltage.

Figure 3:
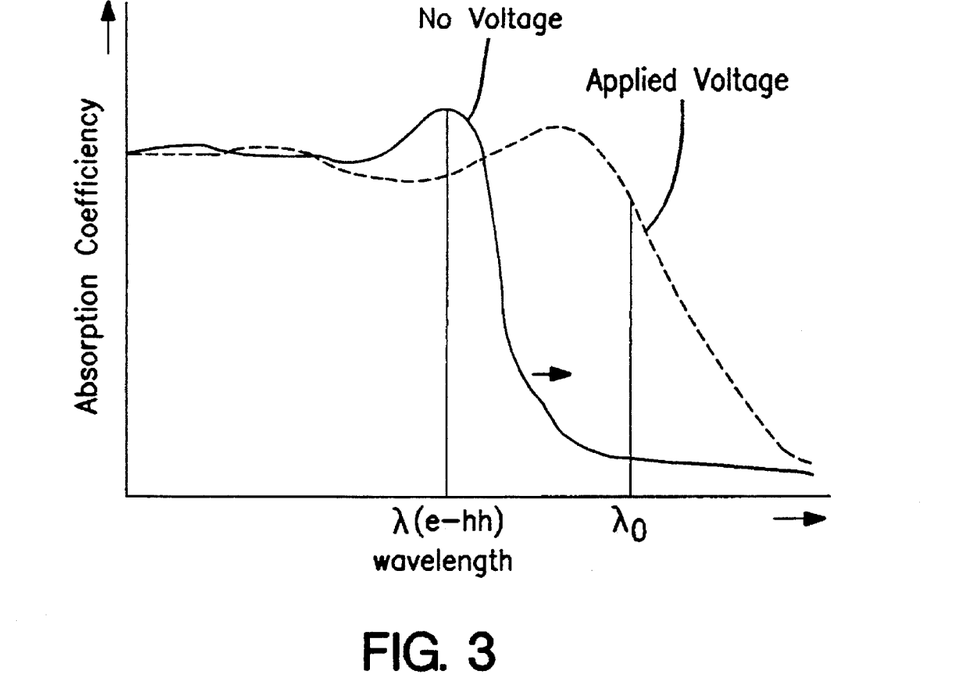
FIG. 3 is a graph showing an absorption coefficiency change as a function of wavelength.

Before describing the detail of the first embodiment, the basic principle of the electro-absorption type semiconductor optical modulator will be explained. The above type of electro-absorption type semiconductor optical modulator is well known as an optical modulator having a function of intensity-modulation. This type of (electro-absorption type semiconductor) optical modulator is described in, e.g., Inoue et al., "InP Semiconductor Optical Modulator and Optical Switch" Optronics, pp. 85–90, No. 6 (1991). The electro-absorption type semiconductor optical modulator may be produced on an InP substrate by growing a plurality of InGaAs/InAlAs ultra thin layers by the MBE method. The ultra thin layer forms a multi-quantum well in the grown crystal. FIG. 3 shows the absorption coefficiency characteristics for varying wavelengths. This characteristic can be changed by the intensity of electric field in the layer. When an electric field is applied, an adsorption peak wavelength $\lambda$e-hh is shifted to longer wavelengths. Therefore, input light having a wavelength of $\lambda$o is intensity-modulates input light by changing its absorption coefficiency However, it has now been recognized that the (electro-absorption type semiconductor) optical modulator can also be utilized as a detector functioning to convert optical signals into electric signals. Under applied voltage to the above layer, when the electro-absorption type semiconductor optical modulator receives light, the light is absorbed in the layer and then the intensity of the electric field changes. Therefore, it becomes possible to receive light signals by detecting the changes of electric field. These changes of electric field can be detected as alternating current signals. The configuration and operation of the first embodiment of the present invention will now be described.

Figure 4:
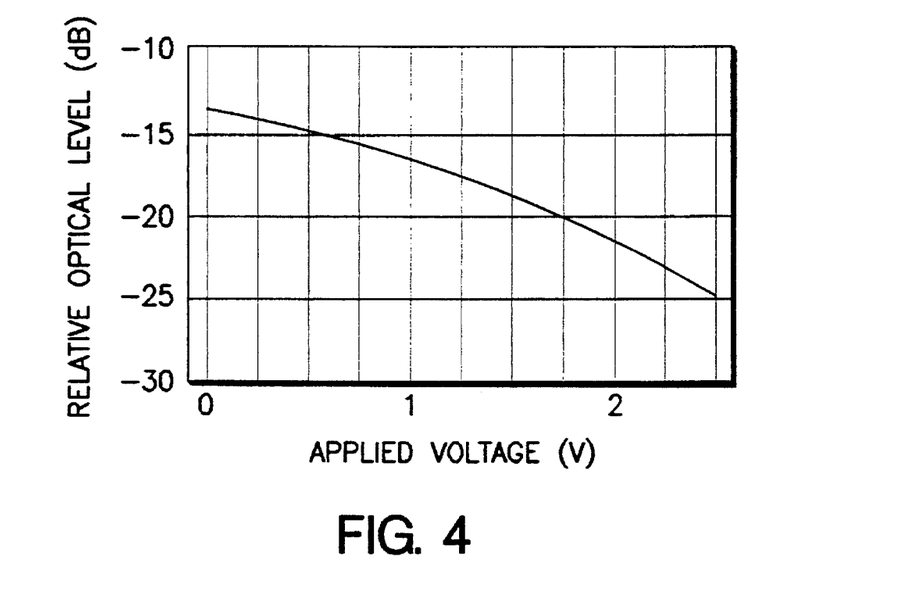
FIG. 4 is a diagram showing a characteristic of the electro-absorption type semiconductor optical modulator employed in the optical transmitting/receiving apparatus of the first embodiment.
Figure 5A:
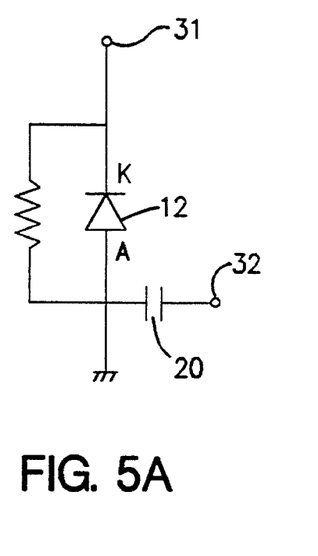
FIGS. 5a–5b show a basic equivalent circuit of the electro-absorption type semiconductor optical modulator in the first embodiment.

FIG. 4 is a graph of the relation between the applied voltage to the above (electro-absorption type semiconductor) optical modulator 12 and the relative output light level, to describe the above basic principle of modulating as used in an optical modulator. FIG. 5 shows a basic equivalent circuit of the (electro absorption type semiconductor) optical modulator 12. In FIG. 5(a), the modulator driving circuit 15 is connected to a terminal 31. In the transmitting state, voltage signals having a positive voltage are applied to a cathode (K) of the (electro-absorption semiconductor) optical modulator 12 from the terminal 31. An anode (A) is connected to ground. The emitting light from the semiconductor laser 11 (not shown) is modulated by changes of electric field in the (electro-absorption type semiconductor) optical modulator 12.

Thus, as shown in FIG. 4, when no voltage is applied to the (electro-absorption type semiconductor) optical modulator 12, loss of the light passing therethrough is approximately 13.5 dB. Whereas when a voltage of 2.5 V is applied to this semiconductor, loss of the light passing therethrough changes to about 25 dB. It should be noted that the above loss due to the light absorption in the (electro-absorption type semiconductor) optical modulator 12 is caused by a portion of incident light being converted into a photocurrent.

Referring back to FIG. 2, the voltage to be applied to the (electro-absorption type semiconductor) optical modulator 12 is furnished from the driving circuit 15 for this optical modulator 12. The voltage outputted from the modulator driving circuit 15 for the (electro-absorption type semiconductor) optical modulator 12 is controlled by a control signal SEA from the control circuit 14. The current/voltage converting circuit 16 is connected to a signal line which is used to apply the voltage to the (electro-absorption type semiconductor) optical modulator 12 by the modulator driving circuit 15.

In this embodiment, the voltage supplier is used in common with the modulator driving circuit 15. This is, the modulator driving circuit 15 is used as a voltage signal generator in the transmitting state. On the other hand, the receiving state, the modulator driving circuit 15 also is used as a reverse bias voltage supplier to the (electro-absorption type semiconductor) optical modulator 12 by selecting its functions with the controller 14. Upon changing to the receiving state, the semiconductor laser 11 at first stops emitting light. Then, the modulator driving circuit 15 applies reverse bias voltage having a constant positive value to the cathode (K) from the terminal 13. When the (electro-absorption type semiconductor) optical modulator 12 receives light signals, voltage changes are outputted form the anode (A). The capacitor 20 can extract elements of alternating current signals. The terminal is connected to a current/voltage converting circuit 16 (not shown).

Figure 5B:
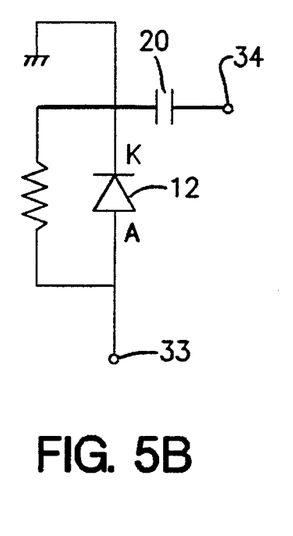

FIG. 5(b) shows another basic circuit of the optical modulator 12 in the first embodiment. In the circuit as shown in FIG. 5(b), the modulator driving circuit 15 is connected to a terminal 33 and voltage signals having negative value are applied to the anode (A). On the contrary, the capacitor 20 is arranged on the cathode side. Needless to say, the capacitor 20 can be arranged at any side of the (electro-absorption type semiconductor) optical modulator 12 in both of FIGS. 5(a) and (b).

With reference to FIGS. 6 and 2, both the operation of the control circuit and the overall operation of the optical transmitting/receiving apparatus will now be described. A selecting control signal is entered from a circuit (not shown) to the control circuit 14. This selecting control signal selectively indicates whether the optical transmitting/receiving circuit is in transmitting state or in receiving state. FIGS. 6a and 6e show the transmission data and reception data, respectively. As schematically represented in FIGS. 6b and 6c, when the control circuit 14 is in the transmitting state, the control circuit 14 outputs a signal with a high level (i.e, a signal causing light emission by the semiconductor laser 11) as the control signal SLD. Also, it outputs such a signal produced by inverting the transmission data TX as the control signal. SEA. When, upon changing to the receiving state, this control circuit 14 outputs a signal SLD with a low level, thereby to halt emission. Also, it outputs a signal with a high level as the control signal SEA to apply a reverse bias voltage by the modulator driving circuit 15.

In accordance with this operation by the control circuit 14, the laser driving circuit 13 may drive the semiconductor laser 11 only in the transmitting state. Also, the modulator driving circuit 15 applies a voltage varied in response to the transmitting signals to the (electro-absorption type semiconductor) optical modulator 12. On the other hand, the modulator driving circuit 15 applies a constant voltage to this optical modulator 12 in the receiving state.

Accordingly, in the transmitting state, the light emitted from the semiconductor laser 11 is intensity-modulated in correspondence with the content of the transmission data within the (electro-absorption type semiconductor) optical modulator 12. The intensity-modulated signal light is outputted on the optical fiber 19 in response to the transmission data, as schematically shown in FIG. 6d.

On the other hand, in the receiving sate, the reverse bias voltage having a predetermined constant value is applied to the (electro-absorption type semiconductor) optical modulator 12. The (electro-absorption type semiconductor) optical modulator 12 absorbs the incident light at a predetermined rate. As previously described, the light absorption in the (electro-absorption type semiconductor) optical modulator 12 is performed by converting the light into photocurrent having alternating current signals. Therefore, the (electro-absorption type semiconductor) optical modulator 12 to which is applied a constant reverse bias voltage generates current changes in response to the level of the incident light.

Figure 6A:
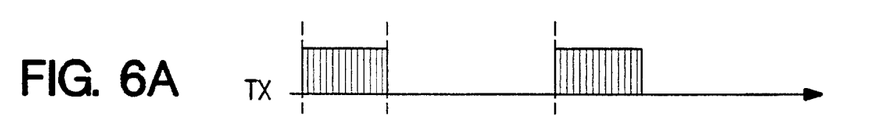
FIG. 6 is a timing chart for explaining the operation of the optical transmitting/receiving apparatus of the first embodiment.
Figure 6B:
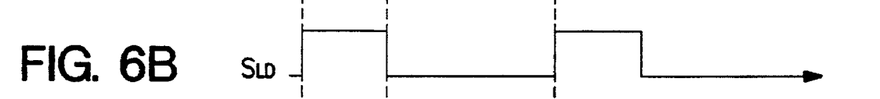
Figure 6C:
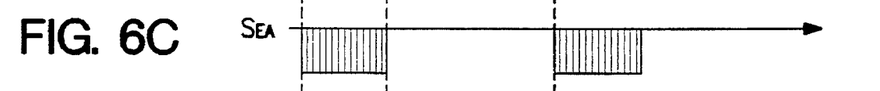
Figure 6D:
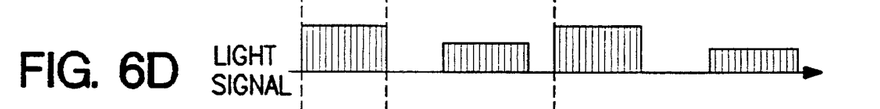
Figure 6E:
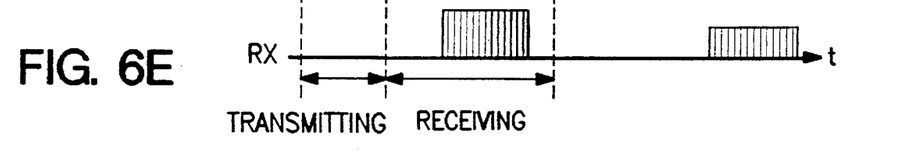

As a consequence, as schematically presented in FIG. 6d, when the light signals are input in the receiving state, the current/voltage converting circuit 16 outputs a signal (see FIG. 6e) whose intensity is varied in response to the intensity changes of the light signal received by the optical transmitting/receiving apparatus. In this embodiment, these signals are used as the reception data RX.

Figure 7:
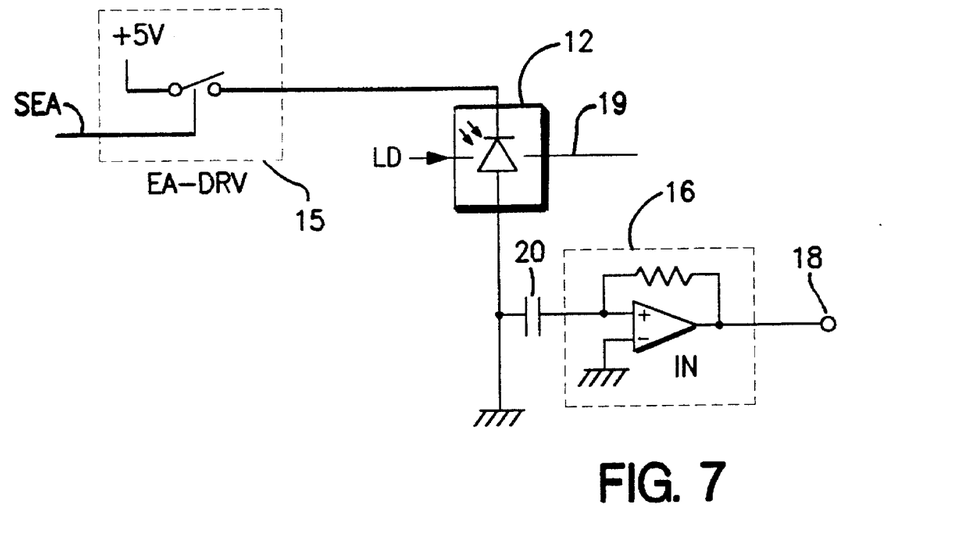
FIG. 7 is an example of the transmitting circuit of the first embodiment.
Figure 8:
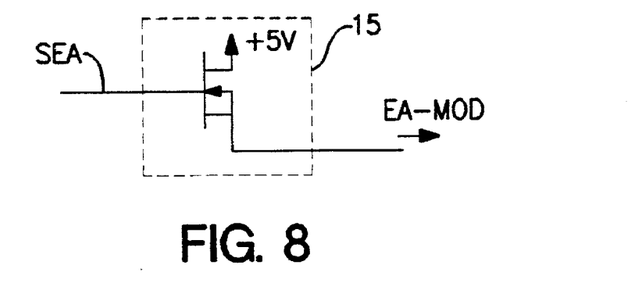
FIG. 8 is another example of the modulator driving circuit of the first embodiment.
Figure 9:
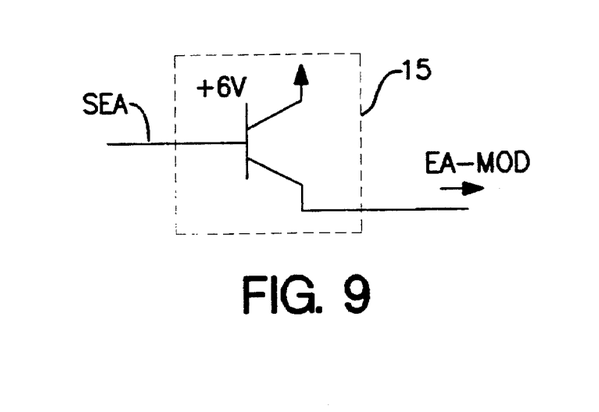
FIG. 9 is the other example of the modulator driving circuit of the first embodiment.

Next, the driving circuit 15 will be described referring to FIGS. 7 through 9. FIG. 7 is an example of the driving circuit 15 and current/voltage converting circuit 16 of the first embodiment. The modulator driving circuit 15 having both functions to send voltage signals and to apply a constant voltage is constructed by using a relay to change connections as shown in FIG. 7. The current/voltage converting circuit 16 can be constructed by a differential amplifier. FIGS. 8 and 9 are the other examples of the modulator driving circuit 15 which use a MOS-FET and a transistor, respectively, to convert the current signals into voltages.

As described above, according to the present invention, both the optical transmitting and receiving elements, are utilized in common. Also, the modulator driving circuit to send the voltage signals and voltage supplier to apply a reverse bias voltage to both of these element can be in common as described in the first embodiment. Therefore, the transmitting/receiving apparatus becomes more compact than the conventional apparatus. In addition, in case of integrating the transmitting and receiving components, it becomes possible to more easily assemble such an optical transmitting/receiving apparatus with higher performance than that of the conventional one.

It should be understood that although the transmitting and receiving states are switched in response to the selecting control signal in the above-described optical transmitting/receiving apparatus of the first embodiment, the data format of the transmission data and reception data may nevertheless be freely selected and any other switching methods for the two states may be utilized. For instance, information input as voice data may be temporarily compressed to produce the transmission data, and then this transmitting data is temporarily expanded to reproduce the voice data as the reception data.

In addition, it is also possible to switch one state to the other by selecting control signals located at the end of the signals.

Figure 10A:
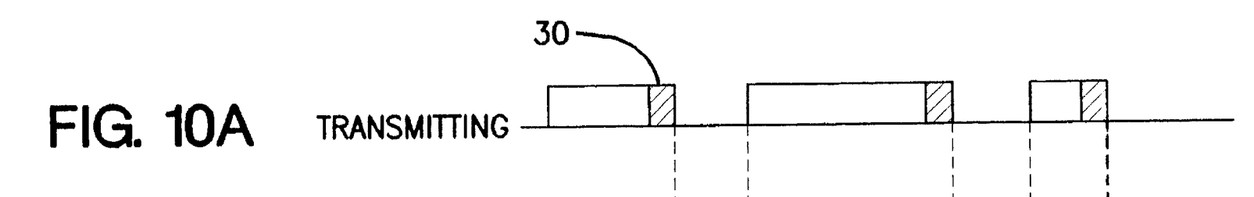
FIG. 10 is a timing chart showing conversion of transmitting/receiving state using a selecting control signal of transmitting signals.
Figure 10B:
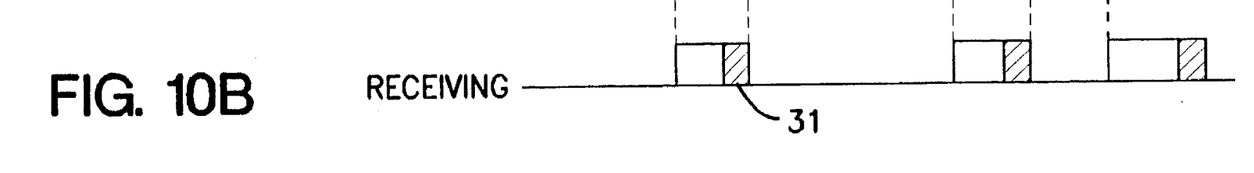

In FIGS. 10, (a) and (b) show a transmitting state and receiving state, respectively. Both transmitting signals from the terminal and transmitted signals from the optical fiber have selecting control signal 30 and 31 at the end of each signals. When the control circuit 14 receives the selecting control signal 30 from transmitting signals (a) the control circuit 14 sends control signals to the driving circuit 13 and the driving circuit 15. The driving circuit 13 stops to send injection current to the semiconductor laser 11 and converts a way that the driving circuit 15 applies the predetermine constant voltage to the (electro-absorption type semiconductor) optical modulator 12(b). On the other hand, when the detector circuit (not shown) receives the selecting control signal 31 front transmitted light signals (b), the control circuit 14 sends control signals. The driving circuit 13 begins to send injection current to the semiconductor laser 14 and the driving circuit 15 begins to apply voltage signals to the (electro-absorption type semiconductor) optical modulator 12(a).

Figure 11A:
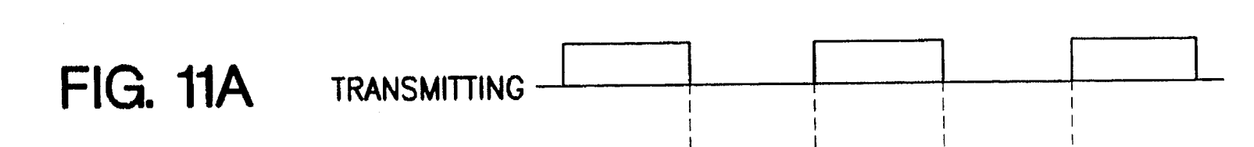
FIG. 11 is a timing chart showing periodical conversion of transmitting/receiving state.
Figure 11B:
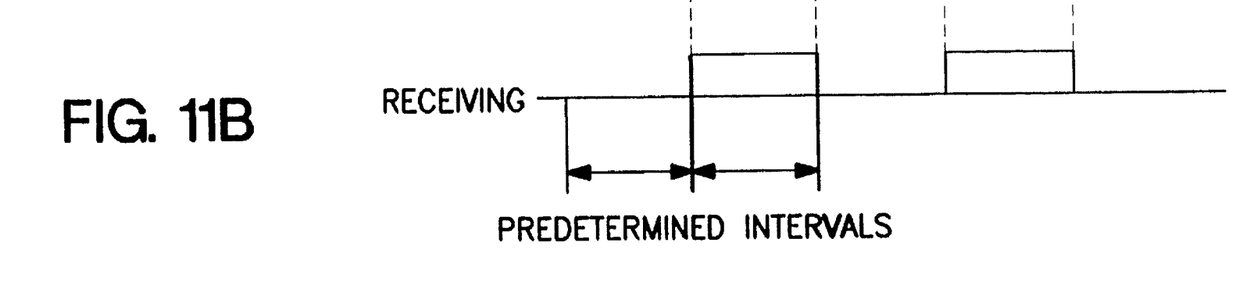

Further, in case that there is a time period during which no light signal is received, a waiting condition may be provided such that no voltage is applied to the (electro-absorption type semiconductor) optical modulator, in addition to the transmitting and receiving states as shown in FIG. 11. Also, during this time period, the optical transmitting/receiving apparatus is so arranged that the operation condition thereof is advanced to the waiting condition. This configuration may make power consumption lower.

Figure 12:
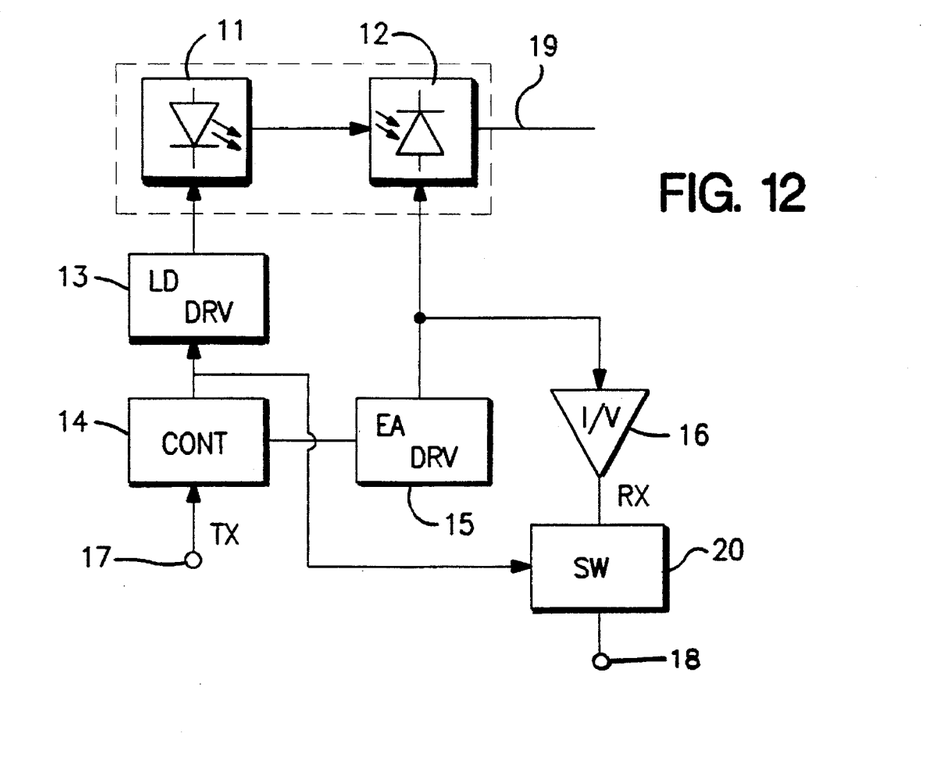
FIG. 12 is a block diagram showing the arrangement of an optical transmitting/receiving apparatus according to a second embodiment of the present invention.

Now, a second embodiment which is improved from the first embodiment of the present invention will be described. FIG. 12 is a block diagram showing the arrangement of an optical transmitting/receiving apparatus according to this second embodiment. In this embodiment, a switch 20 which switches depending on whether the receiving signal line is connected to the terminal 18 is provided between the current/voltage converting circuit (I/V) 16 and the terminal 18. This switch 20 is controlled by signal SLD sent from the controller 14 such that the receiving signal line is connected with the terminal 18 when receiving signals and is disconnected during transmission.

Figure 13:
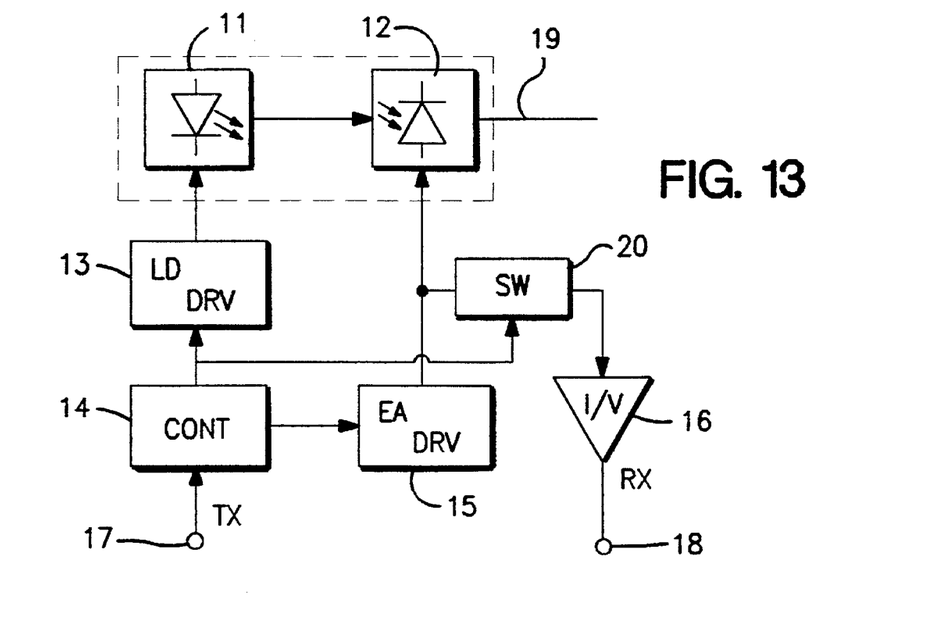
FIG. 13 is a block diagram showing the arrangement of an optical transmitting/receiving apparatus according to a third embodiment of the present invention.

In the first embodiment, the voltage supplier is common with the modulator driving circuit 15. Therefore, even in the transmitting state, unnecessary voltage which is converted from photocurrent generated in the optical modulator 12 by current/voltage converting circuit 25 may affect the equalizer amplifier circuit (not shown). The switch 20 provided therebetween in this embodiment functions to disconnect the receiving signal line from the terminal 18 in the transmitting state. Also, the switch can be provided between the (electro-absorption type semiconductor) optical modulator 12 and the current/voltage converting circuit 16, as shown in FIG. 13. On the contrary, it is not necessary to provide the switch 20 in case the driving circuit and voltage supplier are not in common.

While the present invention has been described with reference to several preferred embodiments, various modifications and adaptations thereof will be readily apparent to those skilled in the art. All such modifications and adaptations that fall within the scope of the appended claims are intended to be covered thereby.

I claim:

1. An optical transmitting/receiving apparatus for bidirectional communication systems, comprising:

an optical fiber transmission path;

light emitting means for emitting light including a semiconductor laser diode and a first driving circuit to send an injection current to said semiconductor laser diode;

second driving means for outputting driving signals in response to transmission signals;

modulating and detecting means for modulating said emitting light in response to said driving signals and radiating said modulated emitting light along said optical fiber transmission path and for detecting light received along said optical fiber transmission path and converting said received light signals into electric signals, said modulating and detecting means being an electro-absorption type semiconductor optical modulator whose light absorption coefficient varies in response to said voltage signals; and monitoring means for monitoring said detected received light signals.

2. The optical transmitting/receiving apparatus for bidirectional communication systems as claimed in claim 1, wherein said semiconductor laser and said electro-absorption type semiconductor optical modulator are produced from a single semiconductor crystal.

3. The optical transmitting/receiving apparatus for bidirectional communication systems as claimed in claim 1, wherein said electro-absorption type semiconductor optical modulator includes an InGaAs/InAlAs multi-quantum well wave guide.

4. The optical transmitting/receiving apparatus for bidirectional communication systems as claimed in claim 1, wherein said electro-absorption type semiconductor optical modulator comprises means for conducting said light emitted from said light emitting means through said optical fiber transmission path.

5. The optical transmitting/receiving apparatus for bidirectional communication systems as claimed in claim 1, wherein said optical transmitting/receiving apparatus further comprises supply means for supplying a predetermined voltage to said electro-absorption type semiconductor optical modulator.

6. The optical transmitting/receiving apparatus for bidirectional communication systems as claimed in claim 1, wherein said second driving means further comprises supply means for supplying a predetermined voltage to said electro-absorption type semiconductor optical modulator, and wherein said optical transmitting/receiving apparatus further comprises selecting means for selecting one of said voltage signals and a predetermined voltage.

7. The optical transmitting/receiving apparatus for bidirectional communication systems as claimed in claim 6, wherein said second driving means, connected to a cathode of said electro-absorption type semiconductor optical modulator, further includes positive voltage applying means for applying positive voltage to said cathode, and said monitoring means, connected to said cathode, further includes capacitor means for extracting alternating current signals from said electric signals.

8. The optical transmitting/receiving apparatus for bidirectional communication systems as claimed in claim 6, wherein said second driving means, connected to a cathode of said electro-absorption type semiconductor optical modulator, further includes positive voltage applying means for applying positive voltage to said cathode and said monitoring means, connected to said cathode, further includes capacitor means for extracting alternating current signals from said electric signals.

9. The optical transmitting/receiving apparatus for bidirectional communication systems as claimed in claim 6, wherein said second driving means, connected to an anode of said electro-absorption type semiconductor optical modulator, further includes negative voltage applying means for applying negative voltage to said anode, and said monitoring means, connected to said anode, further includes capacitor means for extracting alternating current signals from said electric signals.

10. The optical transmitting/receiving apparatus for bidirectional communication systems as claimed in claim 6, wherein said second driving means, connected to an anode of said electro-absorption type semiconductor optical modulator, further includes negative voltage applying means for applying negative voltage to said anode, and said monitoring means, connected to said anode, further includes capacitor means for extracting alternating current signals from said electric signals.

11. The optical transmitting/receiving apparatus for bidirectional communication systems as claimed in claim 6, wherein said transmitting light signals and said detected light signals include selecting control signals for controlling said selecting means.

12. The optical transmitting/receiving apparatus for bidirectional communication systems as claimed in claim 1, wherein said monitoring means includes a converting circuit to convert current signals from said electro-absorption type semiconductor optical modulator into voltage signals.

13. The optical transmitting/receiving apparatus for bidirectional communication systems as claimed in claim 1, wherein said second driving means includes a relay to convert transmitting signals into said voltage signals.

14. The optical transmitting/receiving apparatus for bidirectional communication systems as claimed in claim 13, wherein said second driving means includes a MOSFET to convert transmitting signals into said voltage signals.

15. The optical transmitting/receiving apparatus for bidirectional communication systems as claimed in claim 13, wherein said second driving means includes a transistor to convert transmitting signals into said voltage signals.

16. An optical transmitting/receiving apparatus for bidirectional communication systems as claimed in claim 1, further comprising switch means for switchingly disconnecting said monitoring means from said modulating and detecting means during transmission of said light signals and for switchingly connecting said monitoring means to said modulating and detecting means during a detection of said light signals.

17. An optical transmitting/receiving apparatus for bidirectional communication systems as claimed in claim 1, wherein said second driving means and said monitoring means are mutually operated in a predetermined time period.

18. An optical transmitting/receiving apparatus for bidirectional communication systems as claimed in claim 17, wherein the mutual operation of said second driving means and said monitoring means is advanced to a waiting condition.

19. A method for transmitting/receiving signals in an optical transmitting/receiving apparatus in bidirectional communications systems, said optical transmitting/receiving apparatus comprising an optical fiber, a light emitting source, a driving circuit, an optical modulator, a monitoring circuit, said method comprising the steps of:

emitting light from said light emitting source;

passing said emitted light through said optical modulator in a transmitting state;

modulating, by said optical modulator, said emitting light by changing a passing efficiency of said optical modulator in response to transmitting signals by said driving circuit, said modulating step being performed by an electro-absorption type semiconductor optical modulator, and further comprised a step of applying voltage in response to transmitting signals to said electro-absorption type semiconductor optical modulator;

outputting said modulated emitting light to said optical fiber;

ceasing to emit said light from said light emitting source;

converting transmitted light signals from said optical fiber into detected current signals by said optical modulator in a receiving state; and monitoring, by said monitoring circuit, said detected current signals.

20. The method for transmitting/receiving signals in an optical transmitting/receiving apparatus for bidirectional communication systems as claimed in claim 19, wherein said converting step further comprises a step of applying a bias voltage having a predetermined constant value to said optical modulator.

21. The method for transmitting/receiving signals in an optical transmitting/receiving apparatus in bidirectional communication systems as claimed in claim 20, wherein said monitoring step further comprises a step of detecting a value of a current flowing through said electro-absorption type semiconductor optical modulator under application of said bias voltage, whereby reception data responding to said detected current signals is outputted.

22. The method for transmitting/receiving signals in an optical transmitting/receiving apparatus in bidirectional communication systems as claimed in claim 21, wherein said radiating step, performed by a semiconductor laser diode, further comprises a step of sending an injection current into said semiconductor laser diode.

23. The method for transmitting/receiving signals in an optical transmitting/receiving apparatus in bidirectional communication systems as claimed in claim 19, wherein said method further comprises a step of disconnecting said monitoring circuit from said optical modulator in said transmitting state and a step of connecting said monitoring circuit to said optical modulator in said receiving state.

24. The method for transmitting/receiving signals in an optical transmitting/receiving apparatus in bidirectional communication systems as claimed in claim 19, wherein said modulating step and said converting step are mutually performed in a preselected time period.

25. The method for transmitting/receiving signals in an optical transmitting/receiving apparatus in bidirectional communication systems as claimed in claim 19, wherein said transmitting light signals and said detected light signals include selecting control and, wherein said modulating step and said converting step are controlled by said selecting control signals.

* * * * *